United States Patent
Yamauchi

(10) Patent No.: US 12,159,432 B2
(45) Date of Patent: Dec. 3, 2024

(54) IMAGE PROCESSING APPARATUS, IMAGE GENERATION METHOD, AND STORAGE MEDIUM

(71) Applicant: CANON KABUSHIKI KAISHA, Tokyo (JP)

(72) Inventor: Shohei Yamauchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 311 days.

(21) Appl. No.: 17/530,505

(22) Filed: Nov. 19, 2021

(65) Prior Publication Data
US 2022/0172401 A1  Jun. 2, 2022

(30) Foreign Application Priority Data
Nov. 27, 2020  (JP) .................. 2020-197430

(51) Int. Cl.
*G06T 7/194* (2017.01)
*G06T 7/90* (2017.01)
*G06T 11/60* (2006.01)

(52) U.S. Cl.
CPC ............... *G06T 7/90* (2017.01); *G06T 11/60* (2013.01); *G06T 2207/20224* (2013.01)

(58) Field of Classification Search
CPC ........... G06T 7/90; G06T 11/60; G06T 2207/20224; G06T 7/194; G06T 7/254; G06T 2200/24; G06T 2207/10016; G06T 2207/10024; G06T 2207/10048; G06T 2207/30196; G06T 2207/30221
See application file for complete search history.

(56) References Cited

U.S. PATENT DOCUMENTS

| | | | | |
|---|---|---|---|---|
| 8,059,892 | B1 * | 11/2011 | Fan | G06T 7/11 382/167 |
| 2002/0186881 | A1 * | 12/2002 | Li | G06T 11/00 382/164 |
| 2004/0197021 | A1 * | 10/2004 | Huang | H04N 1/6077 382/168 |

(Continued)

FOREIGN PATENT DOCUMENTS

| | | |
|---|---|---|
| JP | 2007-17364 A | 1/2007 |
| JP | 2015-092643 A | 5/2015 |

(Continued)

OTHER PUBLICATIONS

Notice of Reasons for Refusal issued by the Japanese Patent Office on Sep. 3, 2024 in corresponding JP Patent Application No. 2020-197430, with English translation.

(Continued)

*Primary Examiner* — Aaron W Carter
(74) *Attorney, Agent, or Firm* — Carter, DeLuca & Farrell LLP

(57) ABSTRACT

The image processing apparatus obtains a captured image including a foreground object and a background image not including the foreground object, adjusts pixel values of a pixel included in the background image, a color represented by the pixel values being in a specific color range, and generates an image representing an area of the foreground object based on a difference between the adjusted background image and the captured image.

14 Claims, 12 Drawing Sheets

(56) References Cited

U.S. PATENT DOCUMENTS

| | | | | |
|---|---|---|---|---|
| 2005/0104878 A1* | 5/2005 | Kaye | | G06T 5/77 |
| | | | | 345/419 |
| 2008/0088807 A1* | 4/2008 | Moon | | H04N 9/3182 |
| | | | | 353/121 |
| 2008/0143739 A1* | 6/2008 | Harris | | G09G 5/377 |
| | | | | 345/604 |
| 2008/0205751 A1* | 8/2008 | Mischler | | H04N 1/38 |
| | | | | 382/163 |
| 2010/0031149 A1* | 2/2010 | Gentile | | H04N 5/91 |
| | | | | 348/135 |
| 2010/0225785 A1* | 9/2010 | Shimizu | | H04N 1/60 |
| | | | | 348/E9.053 |
| 2011/0142289 A1* | 6/2011 | Barenbrug | | G06T 7/136 |
| | | | | 382/107 |
| 2013/0301918 A1* | 11/2013 | Frenkel | | G11B 27/036 |
| | | | | 382/180 |
| 2014/0063018 A1* | 3/2014 | Takeshita | | H04N 13/261 |
| | | | | 345/427 |
| 2014/0307056 A1* | 10/2014 | Collet Romea | | G06T 7/174 |
| | | | | 348/46 |
| 2015/0030213 A1* | 1/2015 | Martin | | G06T 11/60 |
| | | | | 382/118 |
| 2016/0019698 A1* | 1/2016 | Kalva | | G06V 20/53 |
| | | | | 382/103 |
| 2017/0104920 A1* | 4/2017 | Kim | | G06T 7/215 |
| 2019/0253638 A1* | 8/2019 | Wen | | H04N 23/56 |
| 2020/0258196 A1* | 8/2020 | Kokura | | G06T 3/4076 |
| 2020/0389573 A1* | 12/2020 | Kobayashi | | H04N 23/72 |
| 2021/0105418 A1* | 4/2021 | Wen | | H04N 5/33 |
| 2021/0297650 A1* | 9/2021 | Onuma | | H04N 23/60 |
| 2021/0366129 A1 | 11/2021 | Yamauchi | | |
| 2022/0172401 A1* | 6/2022 | Yamauchi | | G06T 7/254 |
| 2023/0026038 A1* | 1/2023 | Iwakiri | | H04N 13/117 |

FOREIGN PATENT DOCUMENTS

| | | |
|---|---|---|
| JP | 2016-194778 A | 11/2016 |
| JP | 2018-055367 A | 4/2018 |
| JP | 2020-021397 A | 2/2020 |
| JP | 2020-135653 A | 8/2020 |

OTHER PUBLICATIONS

Nabeshima, K. et al., "A Study on Identifying Outdoor Passengers by Camera Combination vision" Electric Research Institute, Japan, General incorporated Electric engineers (Oct. 2018) pp. 7-12, with English abstract.

* cited by examiner

IMAGE PROCESSING APPARATUS, IMAGE GENERATION METHOD, AND STORAGE MEDIUM

BACKGROUND

Field

The technique of the present disclosure relates to an image processing technique to extract a foreground area from a captured image.

Description of the Related Art

The technique to extract a foreground area (image area corresponding to an object of interest, such as a person) from a captured image is used for a variety of purposes and there are a variety of methods thereof. As the representative method, there is a background difference method. The background difference method is a method in which an input captured image is compared with a background image (image including no object of interest) thereof, which is obtained by a certain method, and a pixel whose difference in the pixel value from a pixel in a correspondence relationship is larger than or equal to a predetermined threshold value is extracted as a foreground area. With this background difference method, in a case where the color of an object that is taken to be a foreground (hereinafter, described as "foreground object") and the color of the background are similar, the difference in the pixel value is small and there is such a problem that it is not possible to extract the foreground area with a high accuracy. In this regard, Japanese Patent Laid-Open No. 2020-021397 has disclosed a technique to stably extract a foreground area even in a case where the color is the same or similar between the foreground and the background by separately using a camera capable of sensing infrared, which is invisible light, and an illuminating device that radiates infrared, in addition to a visible light camera.

The technique of Japanese Patent Laid-Open No. 2020-021397 described above separately requires a device for detecting and radiating invisible light, such as infrared, in addition to the visible light camera, and therefore, there is such a problem that time and effort required for image capturing increase and the facility becomes large in scale.

SUMMARY

An object of the present disclosure is to extract a foreground area from a captured image both simply and appropriately.

An image processing apparatus according to the present disclosure includes: one or more memories storing instructions; and one or more processors executing the instructions to: obtain a captured image including a foreground object and a background image not including the foreground object; adjust pixel values of a pixel included in the background image, a color represented by the pixel values being in a specific color range; and generate an image representing an area of the foreground object based on a difference between the adjusted background image and the captured image.

Further features of the present disclosure will become apparent from the following description of exemplary embodiments with reference to the attached drawings.

DESCRIPTION OF THE EMBODIMENTS

Figure 1A:
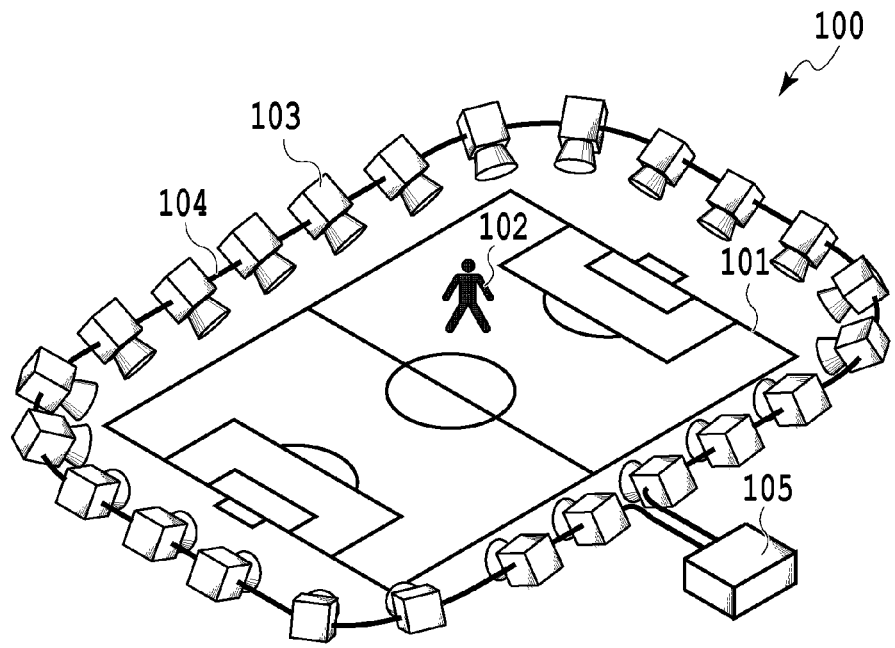
FIG. 1A is a diagram showing an outline configuration of an image processing system and FIG. 1B is a diagram showing a hardware configuration of an image processing apparatus.

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, explanation is given by taking a scene as an application example, in which a foreground area is extracted from a captured image by a background difference method and a foreground silhouette image necessary for generation of a virtual viewpoint image is generated.

First, an outline of a virtual viewpoint image is explained briefly. There is a technique to generate a virtual viewpoint image at an arbitrary virtual viewpoint by using captured images from a plurality of viewpoints, which are captured from a plurality of viewpoints. For example, by using a virtual viewpoint image, it is possible to view and browse a highlight scene of soccer or basketball from a variety of angles, and therefore, it is possible to give a user a feeling of being at a live performance compared to a normal image.

At the time of generating a virtual viewpoint image, processing to perform rendering is performed after separating a foreground portion representing a shape of an object from a background portion and modeling the foreground portion. At the time of modeling the foreground, information on the shape (silhouette) of the object in a case where the object is viewed from a plurality of imaging devices and information on texture of the foreground (for example, color information on R, G, and B of each pixel of the foreground portion) are necessary. The processing to separate the foreground portion from the background portion is called "foreground/background separation processing". As the foreground background separation processing, a "background difference method" is used generally, in which a difference between a captured image including a foreground and a background image thereof is found and the area that is a set of pixels whose difference value is determined to be larger than or equal to a predetermined threshold value is taken to be the foreground area. In the present embodiment, by performing correction for the background image that is used in the background difference method so that the difference from the captured image including the foreground becomes large, the extraction accuracy of the foreground area is increased.

In the present embodiment, explanation is given by taking, as an example, extraction of a foreground area for generating a foreground silhouette image in the system of generating a virtual viewpoint image, but the use of the foreground extraction method disclosed in the present embodiment is not limited to the generation of a foreground silhouette image. For example, the foreground extraction method of the present embodiment is also effective for moving object detection or the like for the use of danger prediction or the like, for example, in a monitoring imaging device that is installed in a variety of facilities, a monitoring imaging device that is installed at remote locations or outdoors, and the like.

System Configuration

FIG. 1A is a diagram explaining an outline configuration of an image processing system 100 of the present embodiment. It is assumed that in a game stadium 101, for example, a game of soccer or the like is played and a person 102 that is taken to be a foreground exists in the game stadium 101. The foreground object includes a specific person, for example, such as a player, a manager, or a referee, or an object whose image pattern is determined in advance, such as a ball and a goal. Further, the foreground object may be a moving object or a stationary object. Around the game stadium 101, a plurality of camera image processing apparatuses 103 is arranged and configured so that it is possible to capture a game of soccer or the like that is played in the game stadium 101 synchronously from a plurality of viewpoints. Each of the plurality of the camera image processing apparatuses 103 has the image capturing function and the image processing function. The camera image processing apparatuses 103 are connected in, for example, a ring network using a network cable 104 and configured to sequentially transmit image data to the next camera image processing apparatus 103 via the network. That is, each camera image processing apparatus 103 is configured to transmit received data along with image data obtained by performing image capturing and processing by itself to the next camera image processing apparatus 103. Then, the image data that is processed in each camera image processing apparatus 103 is finally sent to an integrated image processing apparatus 105. In the integrated image processing apparatus 105, processing to generate a virtual viewpoint image by using the received image data is performed. The system configuration shown in FIG. 1A is an example and not limited to the ring network connection and for example, another connection aspect, such as the star network connection may be used.

Hardware Configuration

Figure 1B:
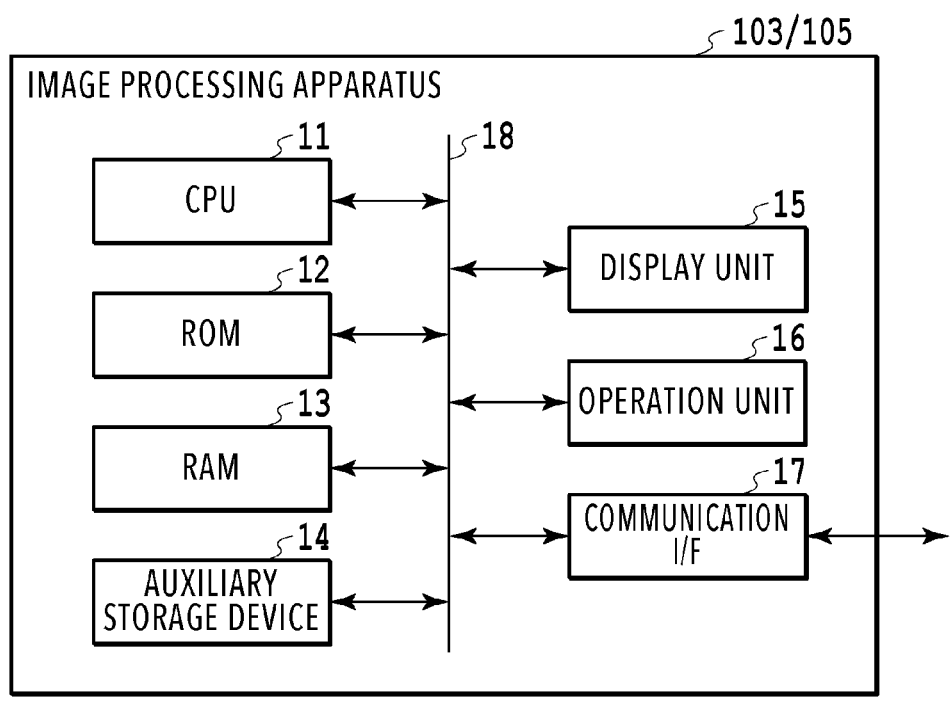

FIG. 1B is a block diagram showing a basic hardware configuration common to the camera image processing apparatus 103 and the integrated image processing apparatus 105. The image processing apparatuses 103/105 have a CPU 11, a ROM 12, a RAM 13, an auxiliary storage device 14, a display unit 15, an operation unit 16, a communication I/F 17, and a bus 18. The CPU 111 implements each function in the image processing apparatuses 103/105 by controlling the entire apparatus using computer programs and data stored in the ROM 12 and the RAM 13. It may also be possible to have one piece or a plurality of pieces of dedicated hardware different from the CPU 11 and for the dedicated hardware to perform at least part of the processing of the CPU 11. As examples of the dedicated hardware, there are an ASIC (Application-Specific Integrated Circuit), an FPGA (Field Programmable Gate Array), a DSP (Digital Signal Processor) and the like. The ROM 12 stores programs and the like that do not need to be changed. The RAM 13 temporarily stores programs and data supplied from the auxiliary storage device 14, data supplied from the outside via the communication I/F 17, and the like. The auxiliary storage device 14 includes, for example, a hard disk drive and the like and stores various kinds of data, such as image data and voice data. The display unit 15 includes, for example, a liquid crystal display, an LED or the like and displays a GUI (Graphical User Interface) for a user to operate the image processing apparatus 105, and the like. The operation unit 16 includes, for example, a keyboard, a mouse, a joystick, a touch panel or the like and receives the operation by a user and inputs various instructions to the CPU 111. The CPU 111 operates as a display control unit configured to control the display unit 15 and an operation control unit configured to control the operation unit 16. The communication I/F 17 is used for communication with a device outside the image processing apparatuses 103/105. For example, in a case of wired-connection with an external device, a communication cable is connected to the communication I/F 17. Further, in a case of having a function to perform wireless communication with an external device, the communication I/F 17 comprises an antenna. The bus 18 transmits information by connecting each unit within the apparatus. In the present embodiment, explanation is given on the assumption that the display unit 15 and the operation unit 16 exist within the apparatus, but it may also be possible for at least one of the display unit 15 and the operation unit 16 to exist outside the apparatus as another device. Further, in the camera image processing apparatus 103, the display unit 15 and the operation unit 16 are not indispensable configurations and the system configuration may be one that can be operated remotely from, for example, an external controller (not shown schematically).

Function Configuration

Figure 2:
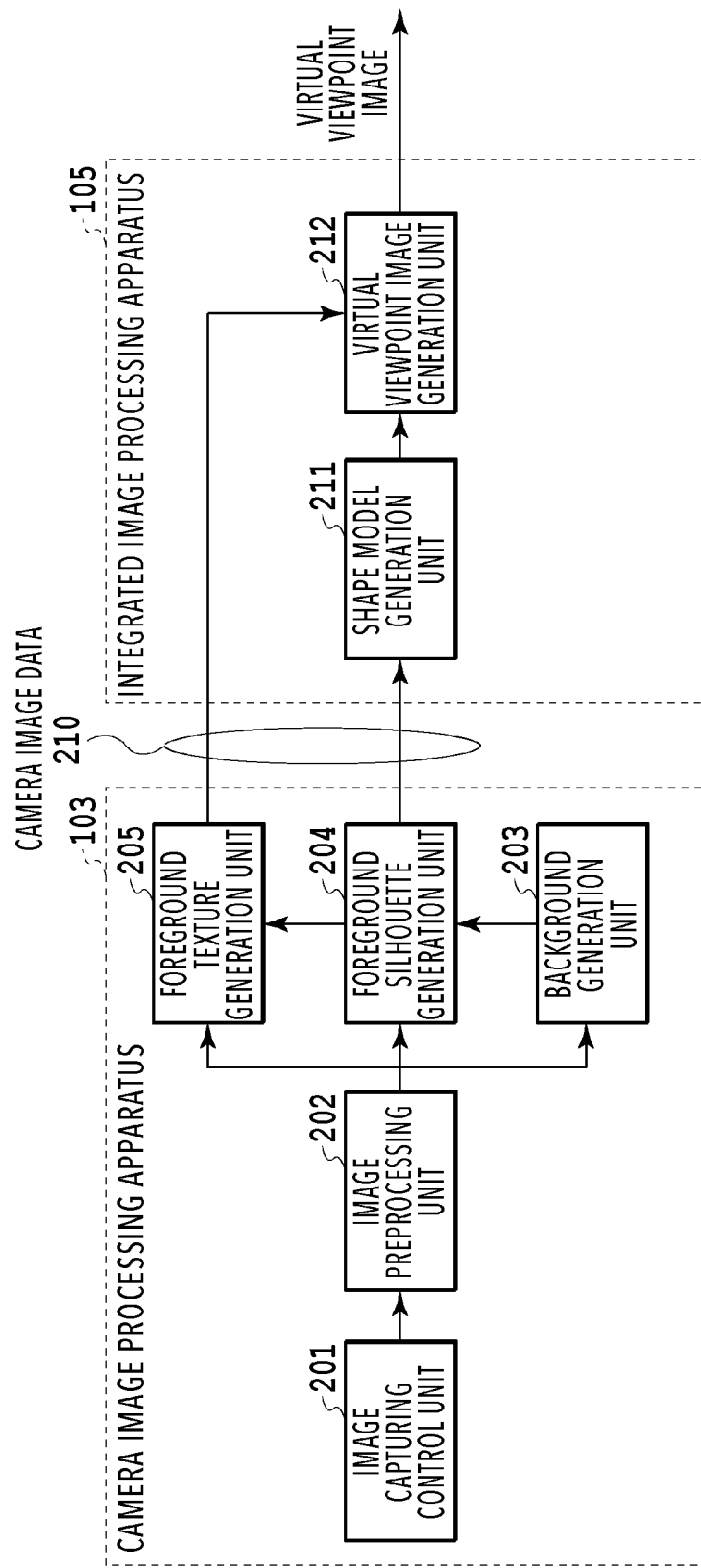
FIG. 2 is a block diagram showing a main function configuration of the image processing system.

FIG. 2 is a block diagram showing the main function configuration in the image processing system 100 of the present embodiment. The camera image processing apparatus 103 includes an image capturing control unit 201, an image preprocessing unit 202, a background generation unit 203, a foreground silhouette generation unit 204, and a foreground texture generation unit 205. The integrated image processing apparatus 105 includes a shape model generation unit 211 and a virtual viewpoint image generation unit 212. In the following, each unit configuring the camera image processing apparatus 103 and the integrated image processing apparatus 105 is explained in order.

First, the internal configuration of the camera image processing apparatus 103 is explained. The image capturing control unit 201 performs image capturing of a moving image at a predetermined frame rate (for example, 60 fps) by controlling an optical system, not shown schematically. An image sensor that is incorporated in the image capturing control unit 201 has an imaging element that detects a visible light area. The image sensor may be one that allocates one pixel of a color filter for a near-infrared area and is capable of simultaneously obtaining a near-infrared image separate from a normal color image (RGB image). In this case, it is possible to perform foreground/background separation processing, to be described later, with four channels, that is, three channels of RGB plus one channel of IR (near-infrared light), and therefore, it is made possible to perform foreground extraction with a higher accuracy. The captured image obtained by the image capturing control unit 201 is input to the image preprocessing unit 202. The image preprocessing unit 202 performs preprocessing, such as fixing, distortion correction, and vibration correction, for the input captured image. The captured image for which the preprocessing has been performed is input for each frame to the background generation unit 203, the foreground silhouette generation unit 204, and the foreground texture generation unit 205, respectively. In the following, the captured image for which the preprocessing has been performed, which is input for each frame to each unit, is called "input image". The background generation unit 203 generates a background image based on the input image from the image preprocessing unit 202. At this time, predetermined correction processing is performed for the generated background image, and its details will be described later. The foreground silhouette generation unit 204 generates a foreground silhouette image by performing the foreground/background separation processing by the background difference method using the input image from the image preprocessing unit 202 and the background image from the background generation unit 203. The foreground silhouette image is also called "foreground mask". The data of the generated foreground silhouette image is input to the foreground texture generation unit 205. The foreground texture generation unit 205 generates a foreground texture by extracting color information on the portion corresponding to the foreground silhouette from the input image from the image preprocessing unit 202. Then, image data 210 (in the following, called "camera image data") that puts together the foreground silhouette image and the foreground texture, which are obtained as described above, is transmitted sequentially from all the camera image processing apparatuses 103 and aggregated in the integrated image processing apparatus 105.

Next, the internal configuration of the integrated image processing apparatus 105 is explained. The shape model generation unit 211 generates shape data representing a three-dimensional shape of an object (in the following, called "shape model") based on the foreground silhouette image included in the received camera image data 210 corresponding to each of the camera image processing apparatuses 103. The virtual viewpoint image generation unit 212 generates a virtual viewpoint image representing an appearance from the virtual viewpoint by pasting the foreground texture to the shape model for coloring and combining the shape model with the background image in accordance with information on the virtual viewpoint position and orientation.

Each of the function units described above is mounted inside the ASIC or the FPGA. Alternatively, the aspect may be one in which the CPU 11 functions as each unit shown in FIG. 2 by the CPU 11 reading programs stored in the ROM 12 or the like onto the RAM 13 and executing the programs. That is, it may also be possible for the camera image processing apparatus 103 and the integrated image processing apparatus 105 to implement each function module shown in FIG. 2 as a software module.

Details of Background Generation Unit

Figure 3:
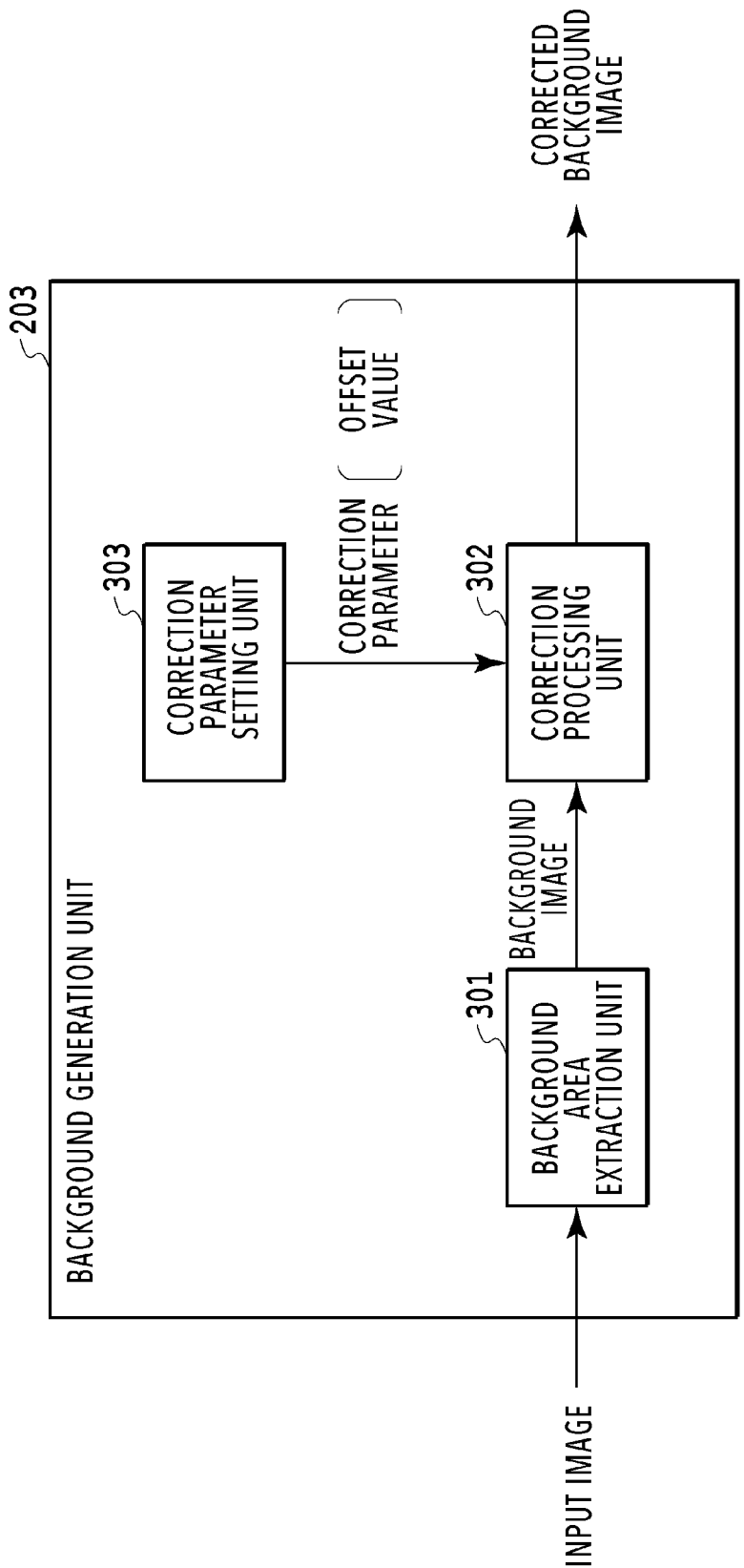
FIG. 3 is a diagram showing an internal configuration of a background generation unit according to a first embodiment.

Next, processing performed by the background generation unit 203 is explained in detail. FIG. 3 is a function block diagram showing the internal configuration of the background generation unit 203 according to the present embodiment. As shown in FIG. 3, the background generation unit 203 has a background area extraction unit 301, a correction processing unit 302, and a correction parameter setting unit 303. In the following, each function unit is explained.

The background area extraction unit 301 extracts a background area from the input image and generates a background image that is used as a base. As the extraction method of a background area, there is a method (inter-frame difference method) in which a stationary area is extracted as a background area from a plurality of input images arranged in a time series. Specifically, a difference in image information between an nth frame that is input and an (n−1)th frame, which is one frame before the nth frame, is found and in a case where the difference exceeds a predetermined value, the area is determined to be a moving area and the other area is determined to be a stationary area, and thereby, a background area is extracted. In this method, two adjacent frames are in the state where the viewing angle is fixed and whose captured times are slightly different, and therefore, the pixel area whose difference between both the frames is smaller than or equal to a threshold value is regarded as a background area. The image indicating the extracted background area is input to the correction processing unit 302 as a base background image, which is the target of correction processing, to be described later.

The correction processing unit 302 performs correction processing for the background image generated in the background area extraction unit 301, which makes it possible for the foreground area to be extracted with a high accuracy. In the present embodiment, processing to change the hue of the color included in the background image is performed as correction processing. In general, the hue is represented by a range of 0 degrees to 360 degrees and 0 degrees and 360 degrees represent red, 60 degrees represent yellow, 120 degrees represent green, 180 degrees represent cyan, 240 degrees represent blue, and 300 degrees represent magenta. In the present embodiment, processing to shift the hue angle of each color included in the input background image by predetermined angles (for example, ten degrees) in the positive or negative direction (processing to apply an offset) is performed, Here, each pixel of the input image has RGB values and each pixel of the background image that is generated from the input image also has RGB values. Consequently, the correction processing unit 302 first converts the color space of the background image from RGB into HSV in order to correct the hue of the color included in the background image. Specifically, by using formula (1) to formula (3) below, a hue of each pixel is found.

in a case where min (R, G, B)=B, $$H=(G-R)/S \times 60+60 \quad \text{formula (1)}$$

in a case where min (R, G, B)=R, $$H=(B-B)/S \times 60+180 \quad \text{formula (2)}$$

in a case where min (R, G, B)=G, $$H=(R-B)/S \times 60+300 \quad \text{formula (3)}$$

In formulas (1) to (3) described above, S represents saturation and is found by formula (4) below.

$$S=\max(R,G,B)-\min(R,G,B) \quad \text{formula (4)}$$

Then, by adding a value of the above-described predetermined angle to the hue angle (or subtracting a value of the above-described predetermined angle from the hue angle), which is a component value representing the hue, for each pixel configuring the background image, the new hue H is calculated. In a case where the hue of each pixel is corrected in this manner, the pixel value is returned this time to the pixel value in the RGB color space by the reverse calculation (reverse conversion) of the conversion formulas described above. Due to this, a new background image whose hue of the color included in the background image has been changed is obtained.

The correction parameter setting unit 303 sets an offset value for the above described correction processing to apply an offset, which is performed in the correction processing unit 302, as a correction parameter. In a case of the present embodiment in which the hue of the color included in the background image is adjusted, the correction parameter setting unit 303 sets the above-described predetermined angle specifying the change amount of the hue as an offset value and provides the offset value as the correction parameter to the correction processing unit 302. Here, it is assumed that, for example, "+ten degrees" are set as the offset value. In this case, as regards the yellowish green pixel within the background image, the hue angle is shifted by ten degrees in the positive direction with respect to its hue angle "90 degrees", and as a result, the tint of blue increases. In a case where the offset value is "-ten degrees", the hue angle is shifted by ten degrees in the negative direction with respect to "90 degrees", and as a result, the tint of yellow increases. The offset value that is set is designated based on the user input, specifically, by a user taking into consideration the color of the main object and the like via a user interface screen or the like, not shown schematically. In a case where the offset value is too large, the possibility become strong that the portion that should be originally the background is extracted erroneously as the foreground area in foreground area extraction processing, to be described later, and therefore, this should be noted.

By the processing as described above, in the present embodiment, the specific color within the base background image is corrected and a new background image is generated.

Figure 4:
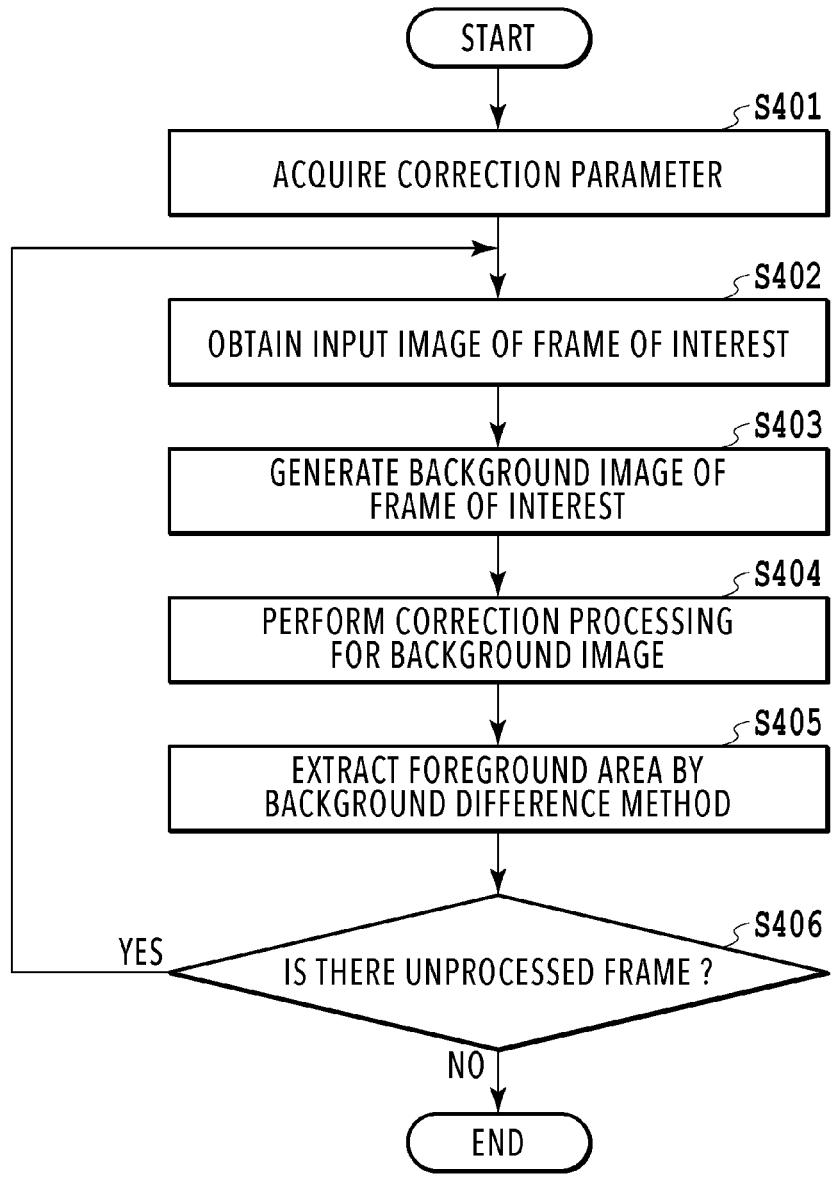
FIG. 4 is a flowchart showing a flow of a series of processing to generate a foreground silhouette image from an input image according to the first embodiment.

Processing of Background Generation Unit and Foreground Silhouette Generation Unit FIG. 4 is a flowchart showing a series of processing to generate a foreground silhouette image from an input image in the camera image processing apparatus 103 of the present embodiment. In the following, along with the flowchart in FIG. 4, detailed explanation is given. Symbol "S" means a step.

At S401, the correction processing unit 302 of the background generation unit 203 obtains the correction parameter (in the present embodiment, offset value) that is set by the correction parameter setting unit 303. At this time, the correction processing unit 302 obtains the correction parameter by reading the information on the offset value that is set and stored in advance from the auxiliary storage device 14 or the like. Alternatively, it may also be possible to cause the display unit 15 to display a UI screen (not shown schematically) for correction parameter setting and then cause first the correction parameter selling unit 303 to set the value of the predetermined angle that is input via the UI screen, and obtain the information on the offset value that is set.

At S402, the background generation unit 203 and the foreground silhouette generation unit 204 obtain the image (input image) of the frame of interest of the moving image for which the image preprocessing has been completed.

At S403, the background area extraction unit 301 within the background generation unit 203 generates a background image from the input image of the frame of interest by the method described previously. The data of the generated background image is input to the correction processing unit 302.

At S404, the correction processing unit 302 within the background generation unit 203 performs correction processing based on the correction parameter obtained at S401 for the input background image. As described previously, in the present embodiment, the processing to adjust the hue of the color included in the background image by the amount corresponding to the offset value that is set in advance is performed as the correction processing. The data of the background image (in the following, called "corrected background image") obtained by the correction processing and in which the hue of the color of each pixel has been changed is input to the foreground silhouette generation unit 204.

At S405, the foreground silhouette generation unit 204 generates a foreground silhouette image by extracting the foreground area in the input image of the frame of interest obtained at S401 by the background different method using the corrected background image generated at S404. The foreground silhouette image is a binary image in which the extracted foreground area is represented by "1" and the other background area is represented by "0". In extraction of the foreground area, first, a difference diff between the input image of the frame of interest and the corrected background image is found. Here, the difference diff is expressed by Mathematical formula (1) below.

$$\text{diff}=K_R^*|R_{in}-R_{bg}|+K_G^*|G_{in}-G_{bg}|+K_B^*|B_{in}-B_{bg}| \quad \text{Mathematical formula (1)}$$

In Mathematical formula (1) described above, ($R_{in}$, $G_{in}$, $B_{in}$) represents pixel values in the input image and ($R_{bg}$, $G_{bg}$, $B_{bg}$) represents pixel values in the corrected background image. Further, $K_R$, $K_G$, and $K_B$ represent the weight of the difference of each of the R component, the G component, and the B component.

In a case where the difference diff between the input image of the frame of interest and the corrected background image is found, next, binarization processing is performed by using a predetermined threshold value TH. Due to this, a foreground silhouette image is obtained in which the foreground area is represented by white (1) and the background area is represented by black (0). The size of the foreground silhouette image may be the same as that of the input image (the same resolution) or the foreground silhouette image may be a partial image obtained by cutting out only the portion of the circumscribed rectangle of the extracted foreground area from the input image. The data of the generated foreground silhouette image is sent to the shape model generation unit 211 as part of the camera image data as well as being input to the foreground texture generation unit 205.

At S406, whether or not the processing is completed for all the frames configuring the processing-target moving image is determined. In a case where the processing for all the frames is not completed, the processing returns to S402, and the next input image of the frame of interest is obtained and the processing is continued. On the other hand, in a case where the processing for all the frames is completed, this processing is terminated.

The above is the flow of the processing until the foreground silhouette image is generated from the input image in the present embodiment. In the present embodiment, explanation is given on the assumption that the background generation unit 203 and the foreground silhouette generation unit 204 obtain the input image of the frame of interest sequentially from the image pro-processing unit 202 in units of frames, but explanation is not limited to this. For example, it may also be possible for each of the background generation unit 203 and the foreground silhouette generation unit 204 to obtain the data corresponding to all the frames of the processing-target moving image and perform processing in units of frames in synchronization with each other.

Here, the difference and the effect of the foreground silhouette image that is obtained by the method of the present embodiment are explained in comparison with those of the conventional technique.

Figure 5A:
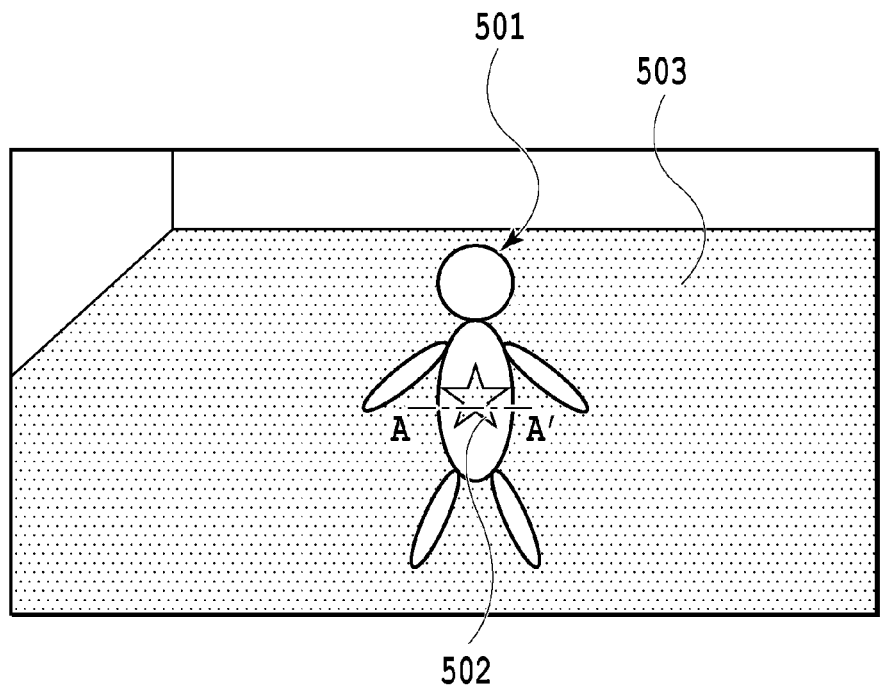
FIG. 5A is a diagram showing an example of an input image and FIG. 5B is a diagram showing an example of a background image.
Figure 5B:
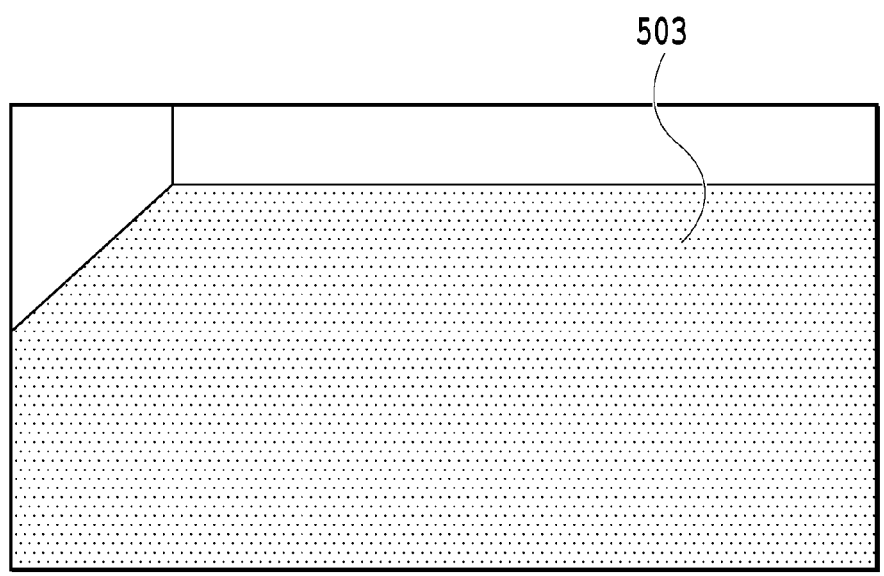
Figure 6A:
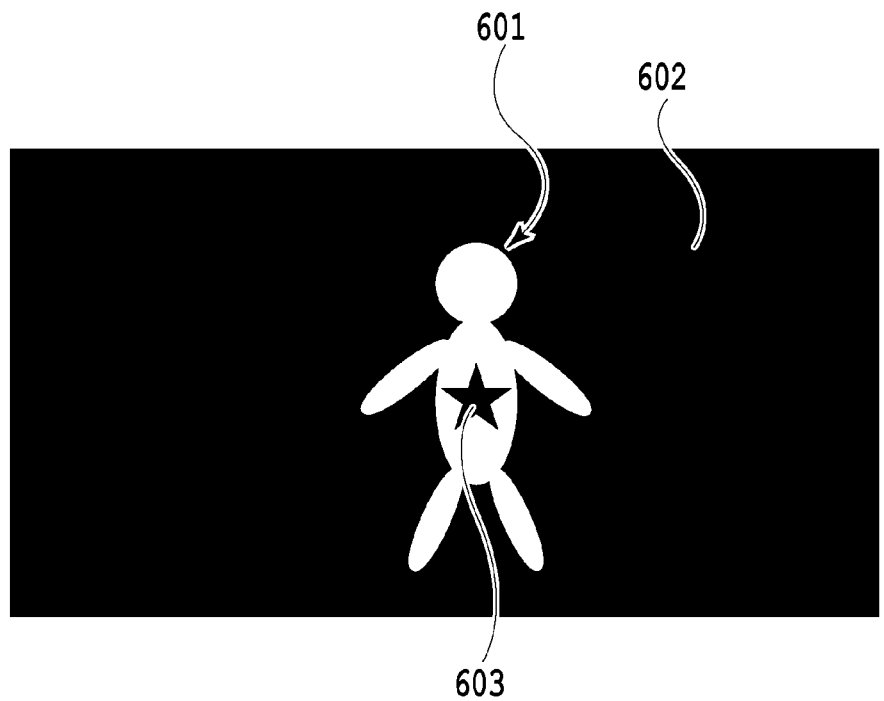
FIG. 6A is a diagram showing an example of a foreground silhouette image by a conventional method and FIG. 6B is a diagram showing an example of a foreground silhouette image by a method of the first embodiment.
Figure 6B:
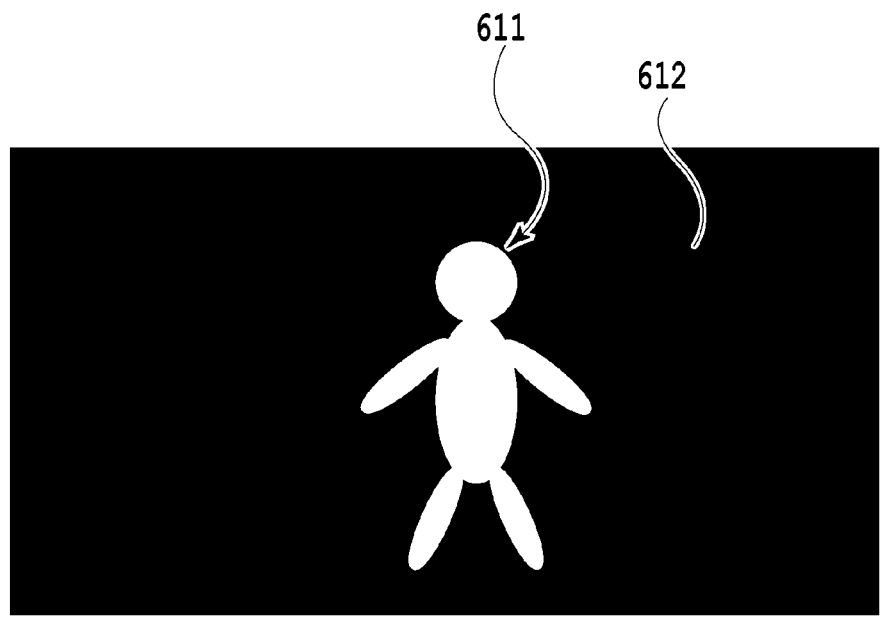
Figure 7A:
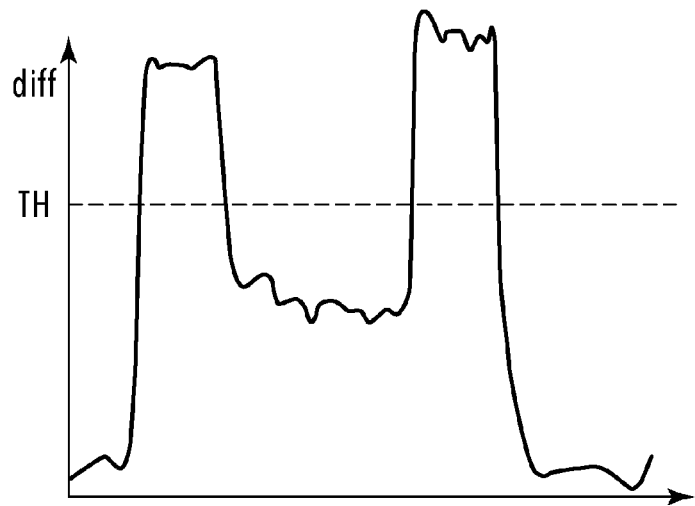
FIG. 7A and FIG. 7B are each a diagram showing an example of a histogram of a difference between an input image and a background image.

FIG. 5A shows an input image of a frame of interest, in which a person object 501 is captured, and FIG. 5B shows a background image of the frame of interest. In this case, it is assumed that the color of a star mark 502 of the clothes worn by the person 501, taken to be a foreground, and the color of a floor 503, taken to be a background, are similar. FIG. 6A and FIG. 6B each show a foreground silhouette image obtained based on the input image in FIG. 5A and the background image in FIG. 5B and FIG. 6A corresponds to the conventional method and FIG. 6B corresponds to the method of the present embodiment. In the foreground silhouette image shown in FIG. 6A, while a silhouette portion 601 of the person 501 is represented by white pixels representing the foreground and a portion 602 other than the portion 601 is represented by black pixels representing the background, a portion 603 corresponding to the star mark 502 is also represented by black pixels. The reason of this is that the color of the star mark 502, which is a pattern of the clothes, and the color of the floor 503, which is the background, are similar, and therefore, the difference diff therebetween does not exceed the threshold value TH for binarization processing and the portion of the star mark 502 is determined to be the background area. FIG. 7A is a diagram explaining the binarization processing at the time of generating the foreground silhouette image in FIG. 6A according to the conventional method and is a histogram in which the horizontal axis represents an x-coordinate in an A-A' cross section in FIG. 5A and the vertical axis represents the value of the difference diff. It can be seen that the value of the difference duff of the portion corresponding to the star mark 502 does not exceed the threshold value TH.

Figure 7B:
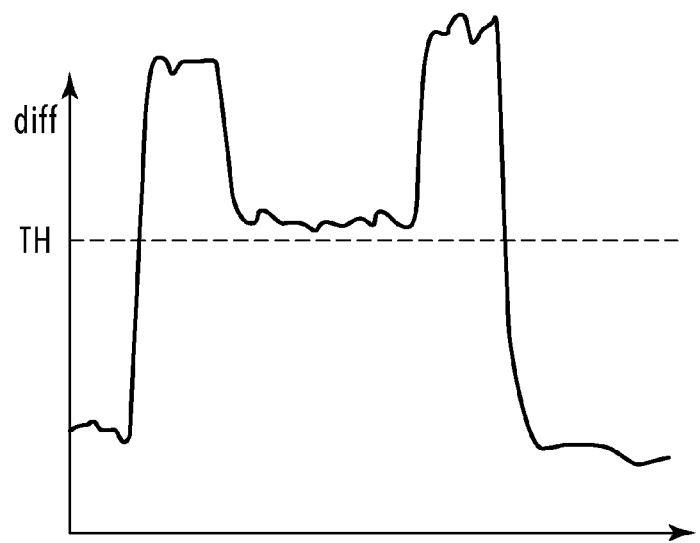

On the other hand, in the foreground silhouette image shown in FIG. 6B according to the present embodiment, an entire silhouette 611 of the person 501 including the portion corresponding to the star mark 502 is represented by white pixels representing the foreground and a portion 612 other than the silhouette 611 is represented by black pixels. Then, FIG. 7B is a histogram explaining the binarization processing at the time of generating the foreground silhouette image in FIG. 6B according to the present embodiment. Different from the histogram of the conventional method shown in FIG. 7A described above, it can be seen that the value of the difference diff of the portion corresponding to the star mark 502 also exceeds the threshold value TH. As described above, with the method of the present embodiment, by the correction processing of the background image, the difference diff between the input image and the background image becomes large so as to exceed the threshold value TH, and therefore, it is made possible to extract the portion of the star mark 502 whose color is similar to that of the background as the foreground area.

Modification Example

In the present embodiment, the background image is generated for each frame, but it is not necessarily required to generate the background image for each frame. For example, in an image capturing scene in which a change in the background due to the sunlight does not occur, such as a game of sport that is played indoors, it may also be possible to use a fixed background image. It is possible to obtain a fixed background image by performing image capturing in the state where, for example, a foreground object does not exist (for example, before the start of game).

Further, in the correction processing of the present embodiment, the color space of the background image is converted from RGB into HSV and then an offset is applied to the hue H, but the contents of the correction processing are not limited to this. For example, it may also be possible to apply an offset to each component value (or one or two component values of RGB) without changing the RGB color space. Further, it may also be possible to convert the color space into a color space other than HSV, for example, YUV and apply an offset to the luminance Y.

As above, according to the present embodiment, by performing the correction processing for the background image, it is made possible to obtain the large difference diff even in a case where the color of the foreground object within the input image and the color of the background are similar. As a result of that, an erroneous determination, such as that part of the foreground area is determined to be the background in the binarization processing for separating the foreground and the background, becomes unlikely to occur, and therefore, it is made possible to appropriately extract the foreground area.

Second Embodiment

In the method of the first embodiment, the entire background image is corrected uniformly with a predetermined correction value. However, in a case of the method in which the entire background image is corrected with a fixed correction value, there is a possibility that the difference value between the pixel, which is in reality a pixel configuring the background, and the input image becomes large on the contrary by the correction, and therefore, the pixel is erroneously extracted as the foreground area. Further, for example, in a case where so-called chroma key image capturing is performed in a dedicated studio, it may happen sometimes that the green back color or the blue back color enters part of the object by reflection. In the case such as this, in order to prevent the portion that the back color has entered of the foreground area within the input image from being erroneously extracted as the background area, it is difficult to cope with this by the method of uniformly correcting the entire background image with a fixed correction value.

Consequently, an aspect is explained as a second embodiment in which the correction processing-target area (correction area) and the correction value are determined adaptively and correction is performed by taking only the necessary area within the background image as a target. Explanation of the contents in common to those of the first embodiment, such as the basic system configuration, is omitted or simplified and in the following, the correction processing for the background image, which is a different point, is explained mainly.

Details of Background Generation Unit

Figure 8:
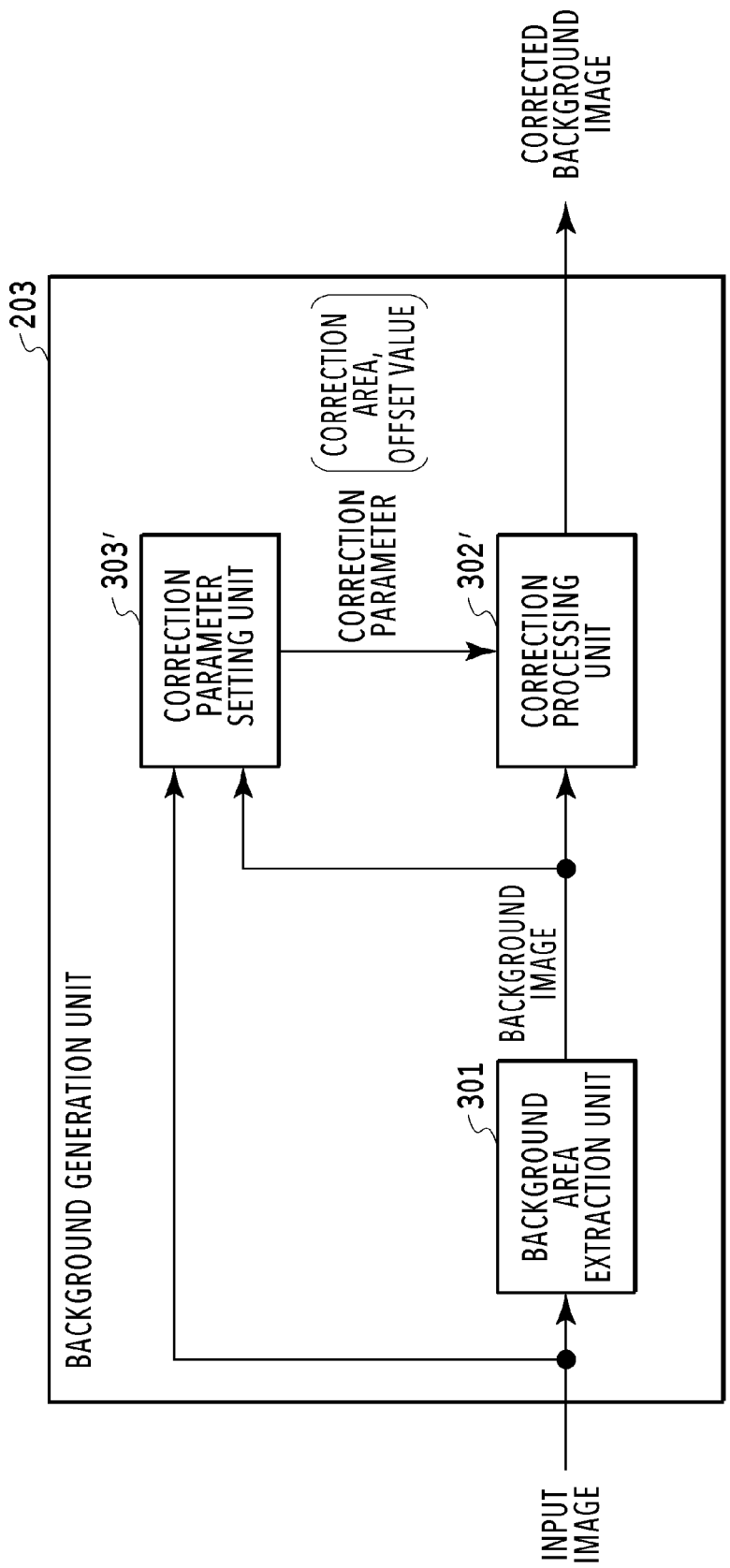
FIG. 8 is a diagram showing an internal configuration of a background generation unit according to a second embodiment.

FIG. 8 is a function block diagram showing the internal configuration of the background generation unit 203 according to the present embodiment. As shown in FIG. 8, the components of the background generation unit 203 are basically the same as those of the first embodiment and the background generation unit 203 has the background area extraction unit 301, a correction processing unit 302', and a correction parameter setting unit 303'. A large difference from the first embodiment lies in that the information for specifying the correction area, which is necessary for correcting a limited background image in the correction processing unit 302', is set as a correction parameter. In the following, each function unit is explained by focusing attention on differences from the first embodiment.

The background area extraction unit 301 extracts the background area from the input image and generates a background image, which is taken to be a base, as in the first embodiment. However, in the present embodiment, the generated background image is input also to the correction parameter setting unit 303', in addition to the correction processing unit 302'.

The correction processing unit 302' performs the correction processing for the background image generated in the background area extraction unit 301 by taking a partial image area within the background image as a target based on the correction parameter set by the correction parameter setting unit 303'. In the present embodiment, explanation is given by taking a case as an example, where the conversion of the color space is not performed for the background image and the correction processing is performed with the RGB color space unchanged.

The correction parameter setting unit 303' adaptively determines the correction area within the background image and the correction value and provides as the correction parameter to the correction processing unit 302'. Here, explanation is given by distinguishing the setting of the correction area from the setting of the correction value.

Setting of Correction Area

Figure 9A:
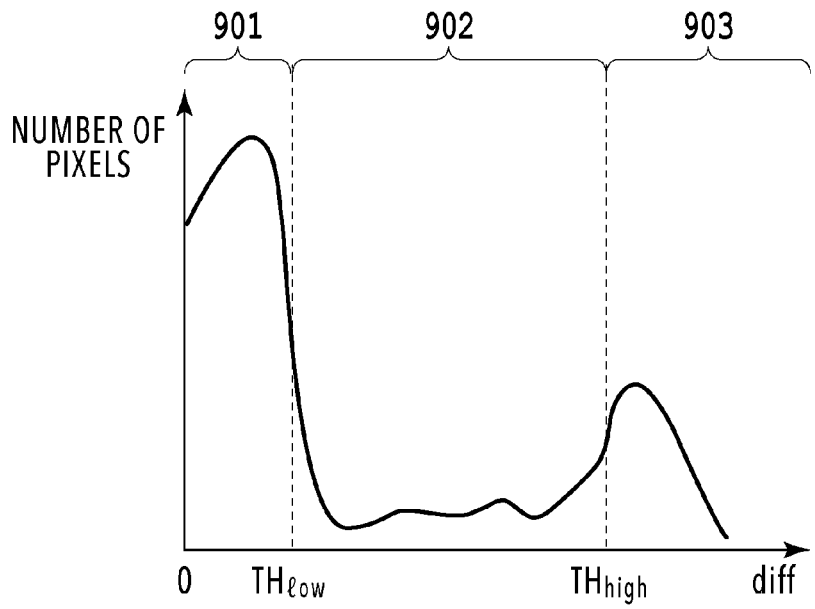
FIG. 9A and FIG. 9B are diagrams explaining setting of a correction area.
Figure 9B:
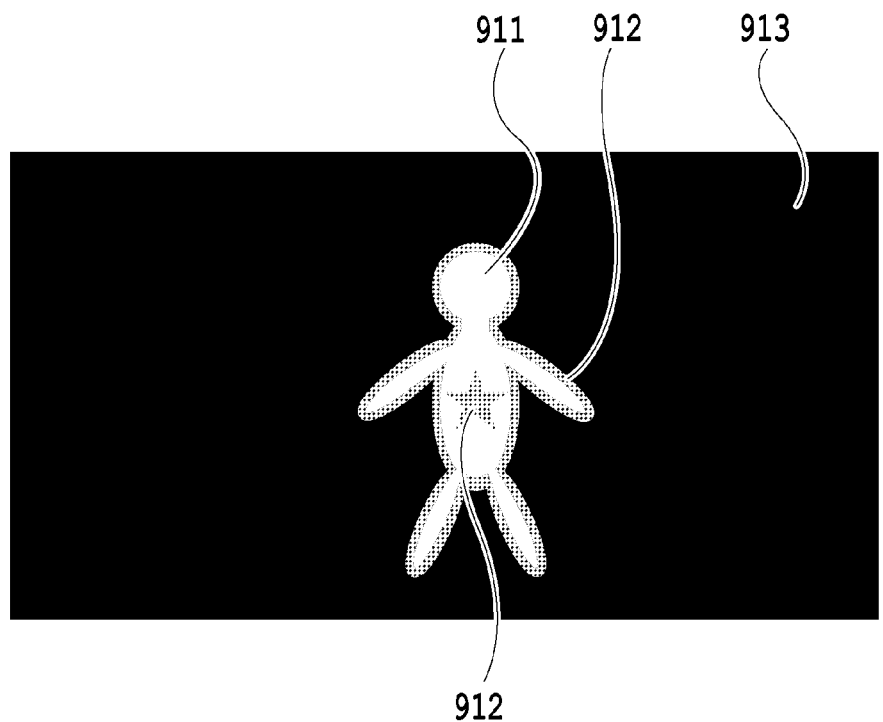

The correction area is set, for example, by using spatial information. Here, the spatial information refers to, for example, a mask image, ROI (Region of interest) and the like. In a case of the mask image, the correction area within the background image is represented by the white (or black) pixel area. In a case of ROI, the correction area within the background image is represented by elements, such as the coordinate position (x, y) and the width (w) and height (h) of the target image area. Here, a determination method of a correction area in a case where the correction area is represented by a mask image is explained by taking the case of the input image in FIG. 5A and the background image in FIG. 5B described previously as an example. In the background image shown in FIG. 5B, the area for which the correction processing is necessary is an area having a possibility of being extracted erroneously because the color is similar to that of the foreground (here, the person object 501). Consequently, first, the difference diff between the input image shown in FIG. 5A and the background image shown in FIG. 5B is found by using formula (1) described previously. FIG. 9A is a histogram of the found difference diff and the vertical axis represents the number of pixels and the horizontal axis represents the difference value. Then, in the histogram in FIG. 9A, two threshold values ($TH_{low}$ and $TH_{high}$) for the difference value are shown. These two threshold values are set by a user via a UI screen or the like, not shown schematically, by focusing attention on the difference between the foreground and the background, for example, the current state where the person that is taken to be the foreground wears clothes whose color is similar to that of the background. Based on the two threshold values set by a user, a range 901 from the point at which the difference value is 0 to the point at which the difference value is the threshold value $TH_{low}$ is the area whose probability of being the background is high. Similarly, a range 902 from the point at which the difference value is $TH_{low}$ to the point at which the difference value is $TH_{high}$ is the area whose probability of being the foreground or the background is ambiguous. Further, a range 903 from the point at which the difference value exceeds $TH_{high}$ is the area whose possibility of being the foreground is high. Then, FIG. 9B is a diagram showing the above-described three kinds of image area, which are separated by the above-described two threshold values $TH_{low}$ and $TH_{high}$, by three kinds of pixel, white, gray, and black, respectively. In FIG. 9B, a white pixel area 911 corresponds to the range 903 of the foreground, a gray pixel area 912 at two portions, that is, the edge of the person object 501 and the star mark 502, corresponds to the ambiguous range 902, and a black pixel area 913 corresponds to the range 901 of the background. Lastly, it is sufficient to determine the two gray pixel areas 912 obtained by the threshold value processing using the above-described two threshold values as the correction area and generate a mask image (in the following, called "correction area mask") in which the determined correction area is represented by white pixels and the other area is represented by black pixels. By using this correction area mask, the limited correction processing is enabled which takes only the image area whose color is similar to that of the foreground object in the background image as a target.

Setting of Correction Value

As regards the correction value, offset values obtained by the arithmetic processing using the above-described two threshold values $TH_{low}$ and $TH_{high}$ are set. In the present embodiment in which the correction processing is performed with the RGB color space unchanged, offset values ($R_n$, $G_n$, $B_n$) of each component of R, G, and B are found by, for example, Mathematical formula (2) or Mathematical formula (3) below, and a weight W of each of R, G, and B.

$$|\vec{n}| = \frac{TH_{high} - TH_{low}}{2} \qquad \text{Mathematical formula (2)}$$

$$|\vec{n}| = TH_{high} - TH_{middle} \qquad \text{Mathematical formula (3)}$$

In this case, it is sufficient to determine the weight W in advance as, for example, (R:G:B)=(1:1:1), even for each component. Here, it is assumed that the above-described two threshold values are $TH_{low}=50$ and $TH_{high}=30$ and Mathematical formula (3) described above is applied. In this case, the range of the image area that approximately seems to be the foreground is a range from the point at which the value of the difference diff is "40" to the point at which it is "50" and by Mathematical formula (3) described above, the value of $$|\vec{n}| \quad \text{Mathematical formula (4)}$$

will be "10". Then, the weight W is even for each component, and therefore, the offset values $(R_n, G_n, B_n)$ are determined to be (3, 3, 3).

Figure 10:
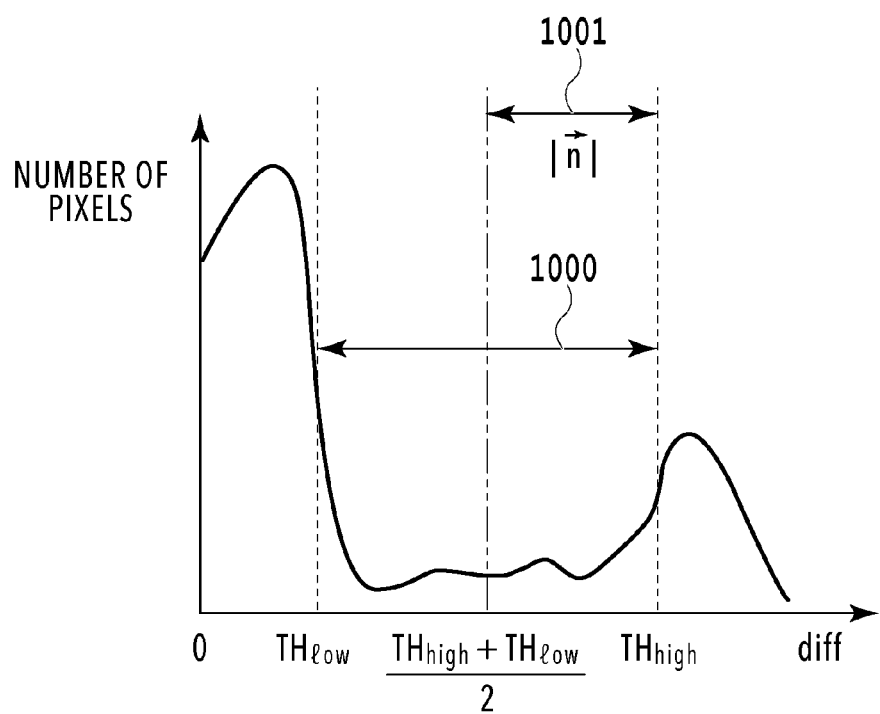
FIG. 10 is a diagram explaining setting of a correction value.

Here, the meaning of determining the offset values by Mathematical formula (2) or Mathematical formula (3) described above is reviewed. FIG. 10 is a histogram of the difference diff between the input image and the background image of a certain frame f and as in the histogram in FIG. 9A, the vertical axis represents the number of pixels and the horizontal axis represents the difference value. As described previously, the image area corresponding to a range 1000 sandwiched by the two threshold values ($TH_{high}$ and $TH_{low}$) set in advance is the image area (intermediate area) whose probability of being the foreground or the background is ambiguous. Then, in this intermediate area, both the image area that should be determined to be the background and the image area that should be determined to be the foreground are included and it is inferred that the image area that should be determined to be the foreground is located on the side nearer to the threshold value $TH_{high}$ in the range 1000. Consequently, for example, by using Mathematical formula (2) described above, the offset values are determined so that the image area corresponding to a range 1001, which is the higher half of the above-described range 1000 sandwiched by the threshold values can be extracted as the foreground.

Figure 11:
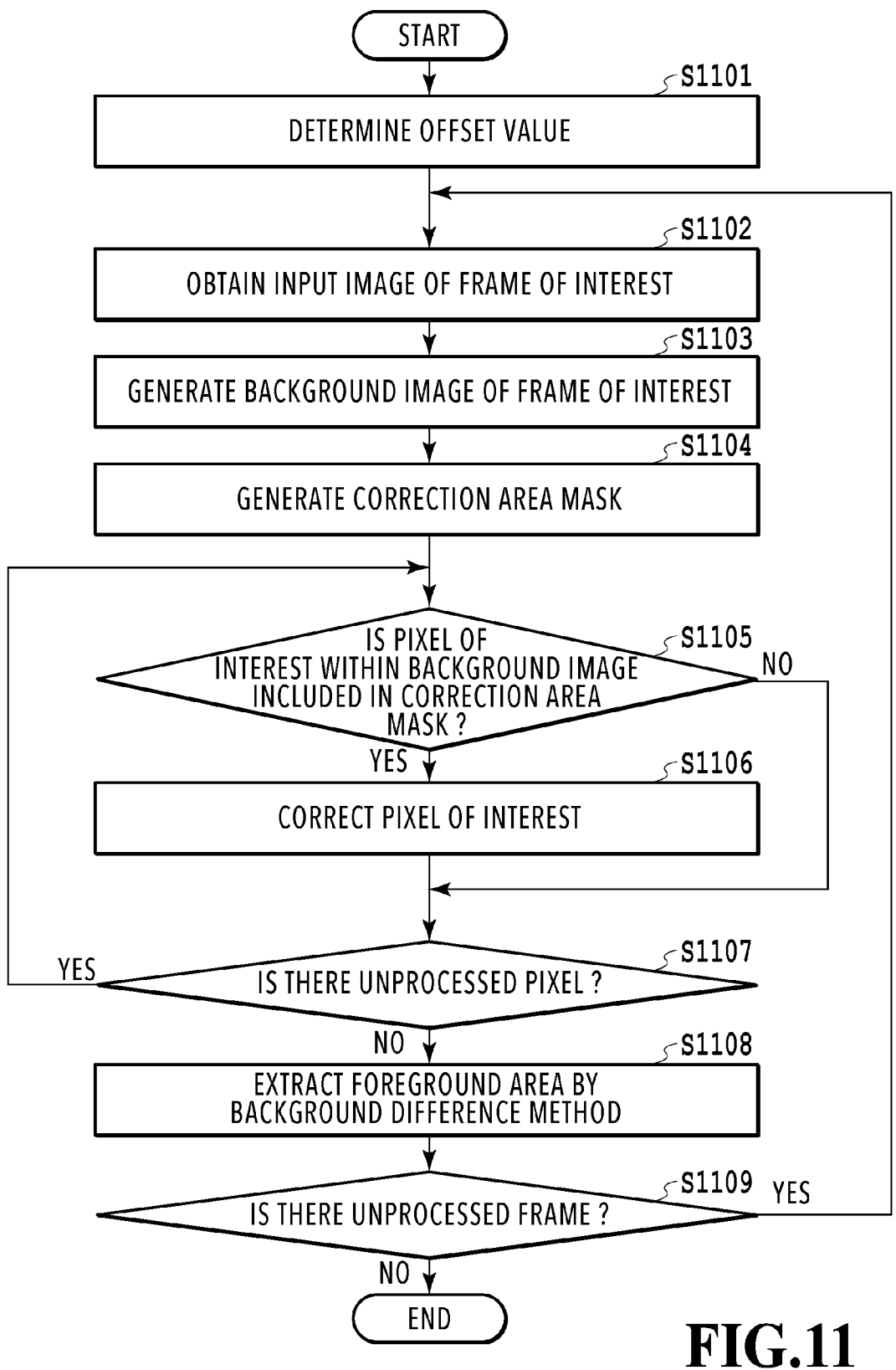
FIG. 11 is a flowchart showing a flow of a series of processing to generate a foreground silhouette image from an input image according to the second embodiment.

Processing of Background Generation Unit and the Foreground Silhouette Generation Unit FIG. 11 is a flowchart showing a flow of a series of processing to generate a foreground silhouette image from an input image in the camera image processing apparatus 103 of the present embodiment. In the following, detailed explanation is given along the flowchart in FIG. 11. Symbol "S" means a step.

At S1101, the correction parameter setting unit 303' of the background generation unit 203 determines an offset value as a correction parameter by the above-described method using the two threshold values ($TH_{low}$ and $TH_{high}$) set in advance. It is sufficient to read the two threshold values ($TH_{low}$ and $TH_{high}$) stored in advance in the auxiliary storage device 14 or the like. The information on the determined offset value is stored in the RAM 13. At next S1102, as at S402 in the flow in FIG. 4 of the first embodiment, the background generation unit 203 and the foreground silhouette generation unit 204 obtain the input image of the processing-target frame of interest. In a case of the present embodiment, the data of the input image obtained by the background generation unit 203 is also sent to the correction parameter setting unit 303', in addition to the background area extraction unit 301.

At S1103, the background area extraction unit 301 within the background generation unit 203 generates a background image using the input image of the frame of interest. The data of the generated background image is input to the correction processing unit 302'.

At S1104, the correction parameter setting unit 303' generates the correction area mask described previously using the background image generated at S1103 and the input image of the frame of interest described above.

At S1105, the correction processing unit 302' determines the pixel on which attention is focused in the background image generated at S1103 and determines whether the position of the pixel of interest is within the mask area (white pixel area) indicated by the correction area mask generated at S1104. In a case where results of the determination indicate that the position of pixel of interest is within the mask area, the processing advances to S1106. On the other hand, in a case where the position of the pixel of interest is outside the mask area, the processing skips S1106 and advances to S1107.

At S1106, the correction processing unit 302' corrects the pixel values of the pixel of interest within the background image using the offset values determined at S1101. In a case of the present embodiment in which the correction processing is performed with the RGB color space unchanged, processing to add the offset values $(R_n, G_n, B_n)$ to the pixel values (R, G, B) at the position (x, y) of the pixel of interest is performed. For example, it is assumed that the offset values are $(R_n, G_n, B_n)=(3, 3, 3)$ and the pixel values of the pixel of interest are (R, G, B)=(100, 100, 50). In this case, the corrected pixel values of the pixel of interest in the background image are (R, G, B)=(103, 103, 53). What is required is to apply offsets, and therefore, it may also be possible to perform subtraction processing in place of the addition processing.

A S1107, the correction processing unit 302' determines whether or not the determination processing at S1105 is completed for all the pixels within the background image generated at S1103. In a case where there is an unprocessed pixel, the processing returns to S1105, and the next pixel of interest is determined and the processing is continued. On the other hand, in a case where the processing is completed for all the pixels within e background image, the processing advances to S1108.

Figure 12:
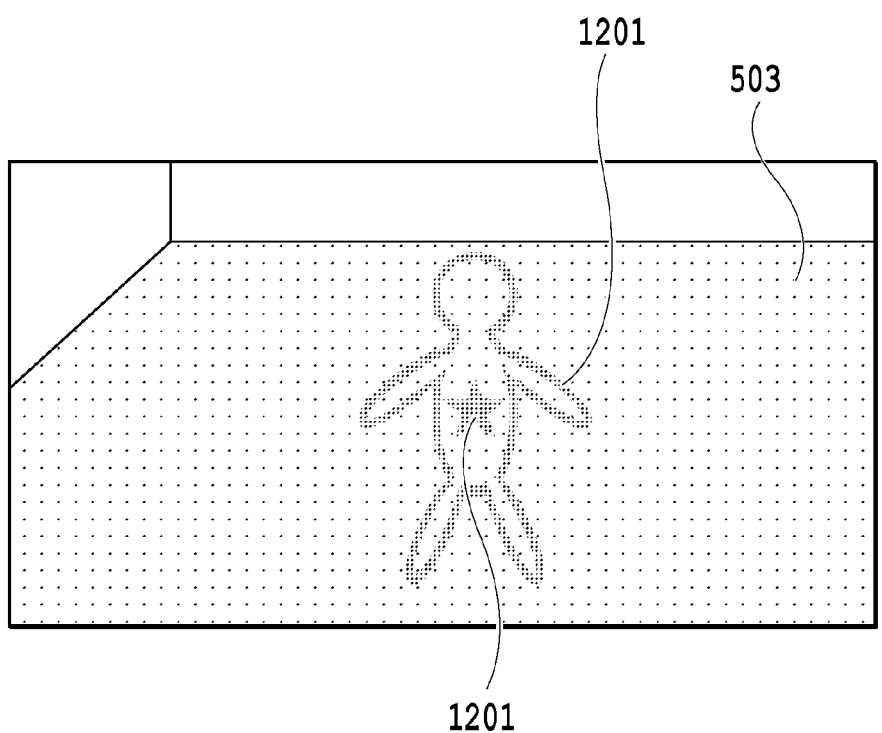
FIG. 12 is a diagram showing an example of a background image in which only a specific image area within the background image has been corrected.

At S1108, as at S405 in the flow in FIG. 4 of the first embodiment, the foreground silhouette generation unit 204 generates a foreground silhouette image by extracting the foreground area in the input image of the frame of interest using the background image corrected by the above-described correction processing. FIG. 12 shows the background image in which the correction processing has been performed by taking only the specific correction area as a target, corresponding to FIG. 9B described previously. In comparison with the background image before the correction shown in FIG. 5B, it can be seen that an area 1201 (that is, the edge of the person object 501 and the portion of the star mark 502) corresponding to the gray area 912 in FIG. 9B has changed by the correction processing.

At S1109, as at S406 in the flow in FIG. 4 of the first embodiment, whether or not the processing of all the frames configuring the processing-target moving image is completed is determined. In a case where the processing of all the frames is not completed, the processing returns to S1102, and the next frame of interest is determined and the processing is continued. On the other hand, in a case where the processing of all the frames is completed, this processing is terminated.

The above is the flow of the processing until the generation of the foreground silhouette image from the input image in the present embodiment. By the above-described processing, the correction processing is performed only for the pixel values of the pixel belonging to the specific image area of the background image.

Modification Example

In the above-described explanation, the spatial information s used to specify the correction area, but color space information may also be used. For example, it may also be possible to specify the minimum value and the maximum value of the hue H in the HSV color space, specify the minimum value and the maximum value of each component value of R, G, and B in the RGB color space, and so on. Due to this, it is possible to specify the image area consisting of the pixels having the hue and the RGB values in the designated range as the correction area. For example, in a case where image capturing is performed by taking a game of soccer or rugby as a target, on a condition that the color of the uniform of the player and the color of the turf, which is the background, are similar, the method such as this is effective. In a case where the HSV color space is used, it is sufficient to designate the hue range around the color of the turf, such as that the lower limit of the hue H is set to $H_{min}=100$ degrees and the upper limit to $H_{max}=140$ degrees. By using the color space information as described above, it is also possible to set only the image area whose probability of being the foreground or the background is ambiguous of the background image as the correction area.

Further, as the correction method, it may also be possible to perform, in place of the processing to apply offsets, processing to fill in each pixel included in the image area in the designated range in a specific color or processing to match the color with the color of the pixel in the peripheral area thereof.

As described above, in a case of the present embodiment, the foreground extraction processing is performed based on the background image in which only the image area that satisfies a predetermined condition is corrected. Due to this, it is possible to more effectively suppress erroneous extraction, such as that the area that is the background in reality is erroneously extracted as the foreground area or on the contrary the area that is the foreground in reality is handled as the background.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to extract the foreground area both simply and appropriately.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-197430, filed Nov. 27, 2020 which is hereby incorporated by reference wherein in its entirety.

What is claimed is:

1. An image processing apparatus comprising:
one or more memories storing instructions; and
one or more processors executing the instructions to:
obtain a captured image including a foreground object and a background image not including the foreground object;
set a specific image area of the background image based on a mask image different from the captured image and the background image;
adjust pixel values of a pixel included in the specific image area of the background image, a color represented by the pixel values being in a specific color range; and
generate an image representing an area of the foreground object based on a difference between the adjusted background image and the captured image.

2. The image processing apparatus according to claim 1, wherein
the adjustment is processing to apply offsets to component values in accordance with a certain color space.

3. The image processing apparatus according to claim 2, wherein
in the adjustment:
a first color space in the background image is converted into a second color space different from the first color space; and
the processing to apply offsets is performed for component values in accordance with the second color space.

4. The image processing apparatus according to claim 3, wherein
the first color space is RGB,
the second color space is HSV, and
in the adjustment, processing to add or subtract an offset value to or from a component value representing a hue of component values of a pixel configuring the background image whose color space has been converted into HSV is performed.

5. The image processing apparatus according to claim 3, wherein
the first color space is RGB,
the second color space is YUV, and
in the adjustment, processing to add or subtract an offset value to or from a component value representing luminance of component values of a pixel configuring the background image whose color space has been converted into YUV is performed.

6. The image processing apparatus according to claim 1, wherein
the specific color range is designated by a user.

7. The image processing apparatus according to claim 1, wherein
the specific color range is determined based on a difference in color between a background image and a captured image.

8. The image processing apparatus according to claim 1, wherein
the mask image represents the specific image area and an image area other than the specific image area by two values.

9. The image processing apparatus according to claim 8, wherein
in the adjustment, the specific image area of the background image is specified based on a difference between the captured image and the background image.

10. The image processing apparatus according to claim 1, wherein
the adjustment is processing to replace pixel values of each pixel belonging to the specific image area with pixel values representing another color.

11. The image processing apparatus according to claim 1, wherein
the adjustment is processing to match pixel values of each pixel belonging to the specific image area with pixel values of a pixel belonging to a peripheral area of the specific image area.

12. The image processing apparatus according to claim 1, wherein
the object is a generation target of three-dimensional shape data.

13. An image processing method comprising the steps of:
obtaining a captured image including a foreground object and a background image not including the foreground object;
setting a specific image area of the background image based on a mask image different from the captured image and the background image;
adjusting pixel values of a pixel included in the specific image area of the background image, a color represented by the pixel values being in a specific color range; and
generating an image representing an area of the foreground object based on a difference between the adjusted background image and the captured image.

14. A non-transitory computer readable storage medium storing a program for causing a computer to perform an image processing method comprising the steps of:
obtaining a captured image including a foreground object and a background image not including the foreground object;
setting a specific image area of the background image based on a mask image different from the captured image and the background image;
adjusting pixel values of a pixel included in the specific image area of the background image, a color represented by the pixel values being in a specific color range; and
generating an image representing an area of the foreground object based on a difference between the adjusted background image and the captured image.

* * * * *